United States Patent
Deng et al.

(10) Patent No.: US 11,264,915 B2
(45) Date of Patent: Mar. 1, 2022

(54) AC-DC CONVERTER AND AC-DC RECTIFIER

(71) Applicant: Silergy Semiconductor Technology (Hangzhou) LTD, Hangzhou (CN)

(72) Inventors: Jian Deng, Hangzhou (CN); Kaiwei Yao, Sunnyvale, CA (US)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 16/937,779

(22) Filed: Jul. 24, 2020

(65) Prior Publication Data
US 2021/0036631 A1    Feb. 4, 2021

(30) Foreign Application Priority Data
Aug. 2, 2019   (CN) .......................... 201910711445.3

(51) Int. Cl.
*H02M 7/219* (2006.01)
*H02M 7/162* (2006.01)
*H02M 1/00* (2006.01)

(52) U.S. Cl.
CPC ......... *H02M 7/219* (2013.01); *H02M 1/0085* (2021.05); *H02M 7/1626* (2013.01); *H02M 1/0095* (2021.05)

(58) Field of Classification Search
CPC ............. H02M 1/0095; H02M 1/0085; H02M 7/1626; H02M 7/219
See application file for complete search history.

(56) References Cited

U.S. PATENT DOCUMENTS

| | | | |
|---|---|---|---|
| 6,005,780 A | 12/1999 | Hua | |
| 6,493,245 B1 * | 12/2002 | Phadke | H02M 1/4225 363/54 |
| 6,580,258 B2 | 6/2003 | Wilcox et al. | |
| 9,325,254 B2 | 4/2016 | Deng et al. | |
| 9,331,588 B2 | 5/2016 | Chen | |
| 9,488,680 B2 | 11/2016 | Xu | |
| 2014/0078789 A1 | 3/2014 | Li et al. | |
| 2014/0239934 A1 | 8/2014 | Zhang | |
| 2015/0160270 A1 | 6/2015 | Shi et al. | |
| 2015/0280578 A1 | 10/2015 | Huang et al. | |

* cited by examiner

*Primary Examiner* — Jue Zhang

(57) ABSTRACT

An AC-DC converter can include: a rectifying circuit configured to convert an AC input voltage into a DC voltage, where at least one active switching device is included in one conductive rectifying loop of the rectifying circuit; a control circuit configured to control switching states of the active switching devices according to an output voltage of the AC-DC converter and the AC input voltage, in order to decrease an error between the DC voltage and the output voltage of the AC-DC converter; and a DC-DC converter configured to convert the DC voltage into the output voltage of the AC-DC converter.

16 Claims, 5 Drawing Sheets

AC-DC CONVERTER AND AC-DC RECTIFIER

RELATED APPLICATIONS

This application claims the benefit of Chinese Patent Application No. 20191071144.3, filed on Aug. 2, 2019, which is incorporated herein by reference in its entirety.

FIELD OF THE INVENTION

The present invention generally relates to the field of power electronics, and more particularly to AC-DC converters and rectifiers.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
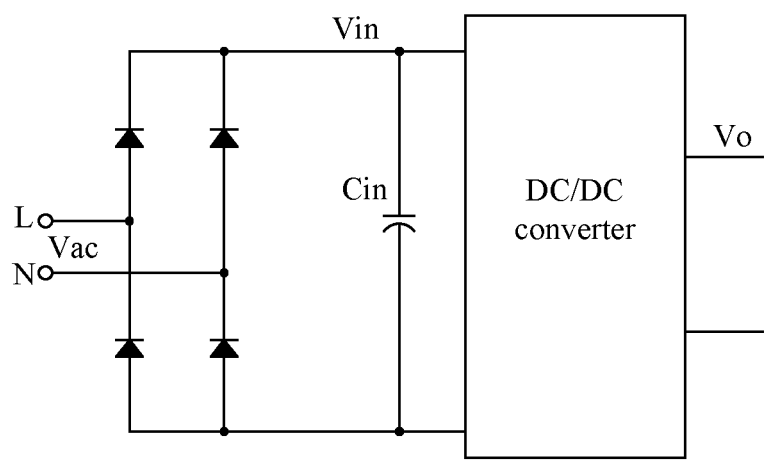
FIG. 1 is a schematic block diagram of an example AC-DC converter.

Referring now to FIG. 1, shown is a schematic block diagram of an example AC-DC converter. In this example, the rectifying circuit converts an AC input voltage into DC voltage Vbus varying periodically, and then DC voltage Vbus is filtered by a high-capacity capacitor to make DC voltage Vbus stable. After that, the DC-DC converter can convert the DC voltage into an output voltage of the AC-DC converter, in order to provide the energy required by the load. Since DC voltage Vbus may not be adjusted, DC voltage Vbus can vary along with the change of the AC input voltage. Thus, the change range of DC voltage Vbus can be relatively wide. In such a case, the DC-DC converter may be required to adapt to the wide range of the input and output voltage, which can result in a relatively low efficiency.

In one embodiment, an AC-DC converter can include: (i) a rectifying circuit configured to convert an AC input voltage into a DC voltage, where at least one active switching device is included in one conductive rectifying loop of the rectifying circuit; (ii) a control circuit configured to control switching states of the active switching devices according to an output voltage of the AC-DC converter and the AC input voltage, in order to decrease an error between the DC voltage and the output voltage of the AC-DC converter; and (iii) a DC-DC converter configured to convert the DC voltage into the output voltage of the AC-DC converter.

Figure 2:
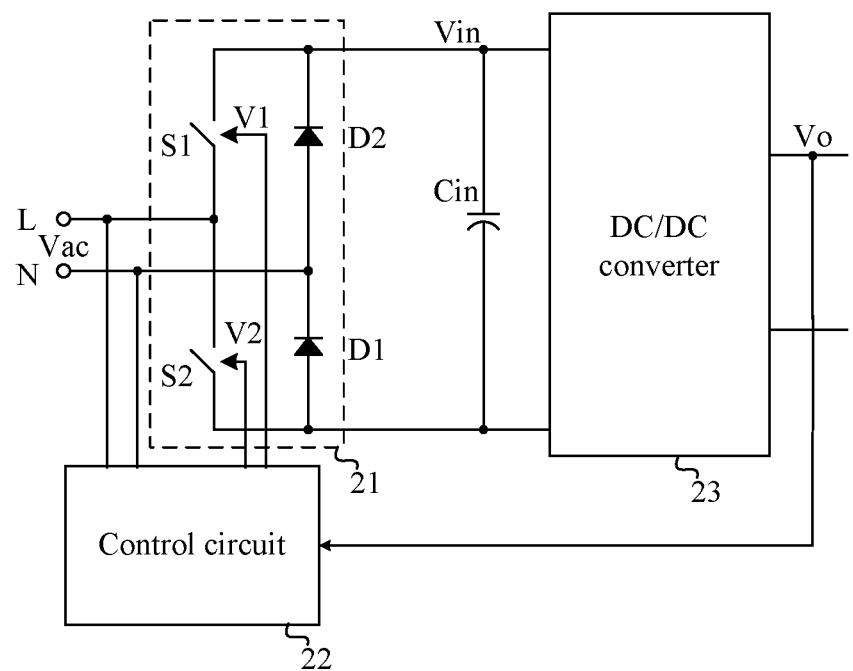
FIG. 2 is a schematic block diagram of an example AC-DC converter, in accordance with embodiments of the present invention.
Figure 3:
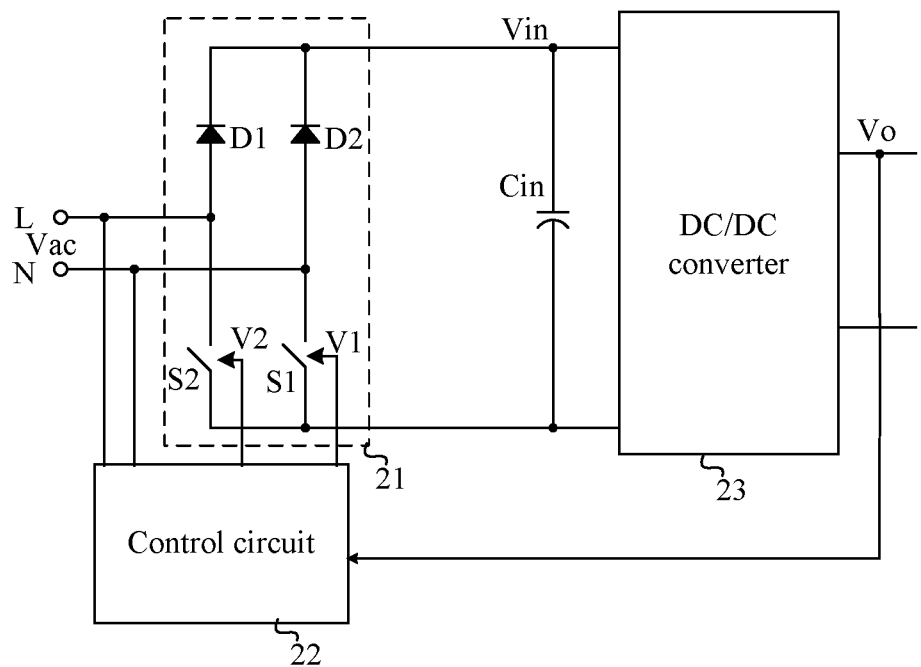
FIG. 3 is a schematic block diagram of another example AC-DC converter, in accordance with embodiments of the present invention.

Referring now to FIG. 2, shown is a schematic block diagram of an example AC-DC converter, in accordance with embodiments of the present invention. Referring also to FIG. 3, shown is a schematic block diagram of another example AC-DC converter, in accordance with embodiments of the present invention. In particular embodiments, the AC-DC converter can include rectifying circuit 21, control circuit 22, and DC-DC converter 23. Rectifying circuit 21 can receive AC input voltage Vac, and may convert AC input voltage Vac into DC voltage Vin. Moreover, rectifying circuit 21 can include at least one active switching device in each conductive rectifying loop. For example, rectifying circuit 21 is a single-phase bridge rectifying circuit. In some examples, the rectifying devices in at least one bridge arm of the single-phase bridge rectifying circuit are active switching devices. In other examples, the rectifying devices connected with one terminal of the output port of rectifying circuit 21 (e.g., ground or DC voltage Vin) are active switching devices.

Since rectifying circuit 21 receives AC input voltage Vac, the active switching device effectively needs to bear a positive withstand voltage or a negative withstand voltage. For example, the active switching devices can be thyristors or transistors. In particular embodiments, input electrolytic capacitor Cin can be connected between the two terminals of the output port of rectifying circuit 21. For example, input electrolytic capacitor Cin can connect between rectifying circuit 21 and DC-DC converter 23, in order to filter the output voltage of rectifying circuit 21.

In FIG. 2, the rectifying devices in at least one bridge arm of the single-phase bridge rectifying circuit can be active switching devices. For example, the upper rectifying device of the first bridge arm of the single-phase bridge rectifying circuit is active switching device S1, and the lower rectifying device in the first bridge arm of the single-phase bridge rectifying circuit is active switching device S2, which can connect in series with active switching device S1. Alternatively, the upper rectifying device of the second bridge of the single-phase bridge rectifying circuit is diode D2, and the lower rectifying device of the second bridge of the single-phase bridge rectifying circuit is diode D1. It should be understood that both the upper and lower rectifying devices of the second bridge arm of the single-phase bridge rectifying circuit can be active switching devices, or one of the upper and lower rectifying devices of the second bridge arm of the single-phase bridge rectifying circuit can be an active switching device. That is, at least one active switching device may be arranged in each conductive rectifying loop.

In the example of FIG. 3, the rectifying devices connected with the same ground (e.g., the lower rectifying devices) can be active switching devices. For example, the lower rectifying device of the first bridge arm of the single-phase bridge rectifying circuit is active switching device S2, and the lower rectifying device of the second bridge arm of the single-phase bridge rectifying circuit is active switching device S1. For example, the upper rectifying device of the first bridge arm of the single-phase bridge rectifying circuit is diode D1, and the upper rectifying device of the second bridge of the single-phase bridge rectifying circuit is diode D2. It should be understood that both the upper rectifying device of the first bridge arm of the single-phase bridge rectifying circuit, and the upper rectifying device of the second bridge arm of the single-phase bridge rectifying circuit, can be active switching devices. Alternatively, one of the upper rectifying device of the first bridge arm of the single-phase bridge rectifying circuit, and the upper rectifying device of the second bridge arm of the single-phase bridge rectifying circuit, can be an active switching device. That is, at least one active switching device can be arranged in each conductive rectifying loop.

In particular embodiments, the upper rectifying device of the first bridge arm and the lower rectifying device of the second bridge arm can be synchronously controlled to be turned on or off. In addition, the lower rectifying device of the first bridge arm and the upper rectifying device of the second bridge arm can be synchronously controlled to be turned on or off in the opposite manner. Therefore, rectifying circuit 21 can rectify AC input voltage Vac to generate DC input voltage Vin that is adjusted to correspond to output voltage Vo.

In addition, in both FIGS. 2 and 3, the input port of DC-DC converter 23 can connect to the output port of rectifying circuit 21. Further, DC voltage Vin generated by rectifying circuit 21 can be adjusted to a required output voltage Vo by DC-DC converter 23, in order to supply power to the load. In alternative embodiments, DC-DC converter 23 can be an isolated converter or a non-isolated converter, and DC-DC converter 23 can be a resonant converter or a multi-level converter.

Control circuit 22 can adjust DC voltage Vin according to the change of output voltage Vo of DC-DC converter 23, such that a ratio of DC voltage Vin to output voltage Vo approaches a predetermined ratio. For example, control circuit 22 can set reference voltage Vref that represents DC voltage Vin to be proportional to output voltage Vo, such that the ratio of DC voltage Vin to output voltage Vo approaches the predetermined ratio.

Thus, control circuit 22 can adjust a duty ratio or on time of the active switching devices according to reference voltage Vref, thus adjusting DC voltage Vin, such that the ratio of DC voltage Vin to output voltage Vo approaches the predetermined ratio. In this way, the ratio of the DC voltage across input electrolytic capacitor Cin to output voltage Vo is controlled to vary within a relatively small range. As a result, the efficiency of DC-DC converter 23 can be greatly improved, and the volume of DC-DC converter 23 reduced. For example, control circuit 22 can turn on the active switching devices when absolute value |Vac| of AC input voltage Vac decreases close to reference voltage Vref, such that AC input voltage Vac charges input electrolytic capacitor Cin in order to control DC voltage approaches reference voltage Vref.

Figure 4:
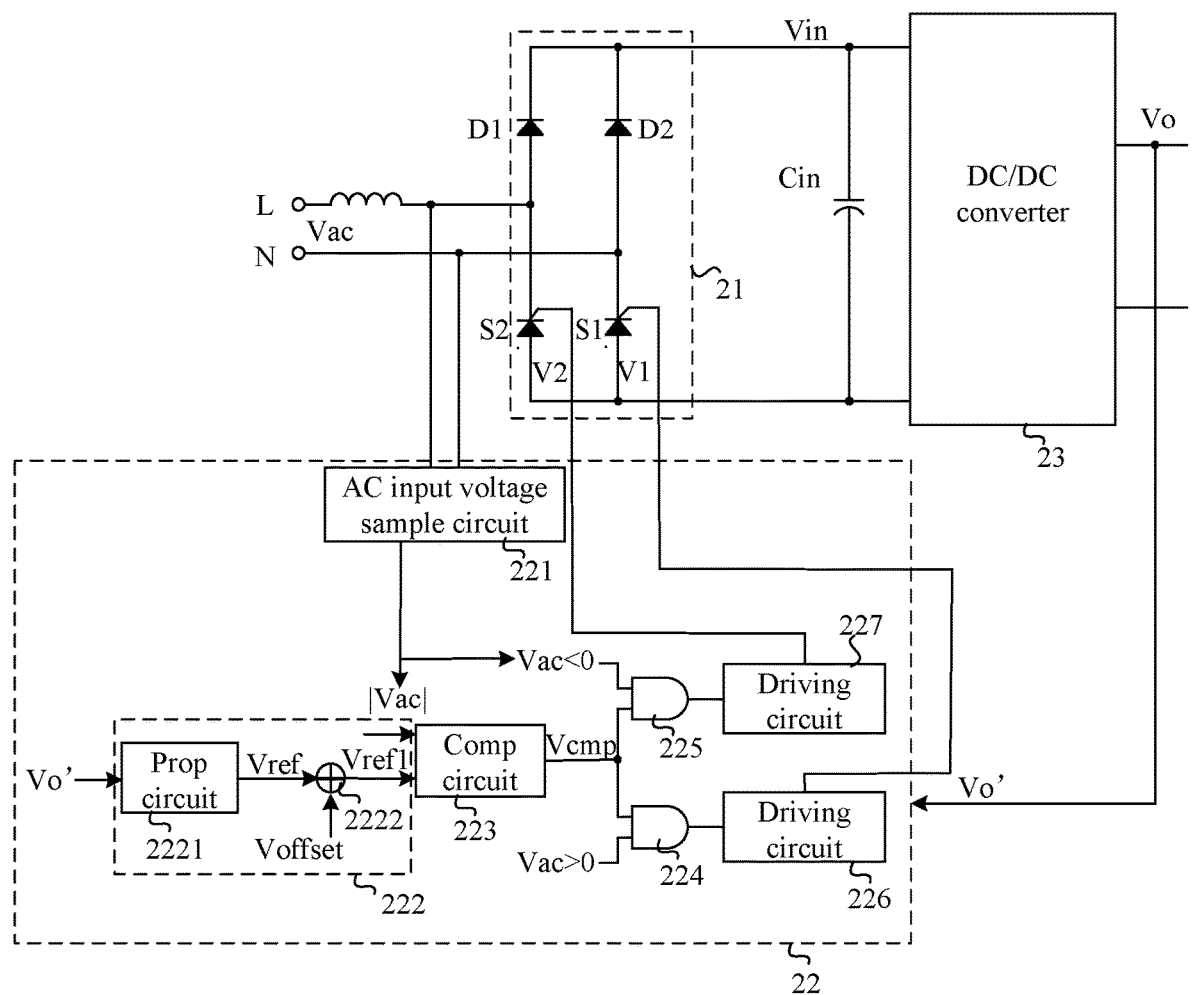
FIG. 4 is a schematic block diagram of an example control circuit, in accordance with embodiments of the present invention.

Referring now to FIG. 4, shown is a schematic block diagram of an example control circuit, in accordance with embodiments of the present invention. In this particular example, control circuit 22 can include AC input voltage sample circuit 221, reference voltage generation circuit 222, comparison circuit 223, logic circuitry 224 and 225, driving circuit 226, and driving circuit 227. For example, AC input voltage sample circuit 221 can sample AC input voltage Vac, obtain the absolute value of AC input voltage Vac, and then determine that whether the actual value of AC input voltage Vac is greater than zero.

Reference voltage generation circuit 222 can obtain reference voltage Vref according to output voltage Vo. For example, ratio coefficient K of reference voltage Vref to output voltage Vo is the ratio of peak value $Vac_{MIN,PK}$ of AC input voltage Vac when the range of input AC voltage Vac is minimum to maximum value $Vo_{MAX}$ of output voltage Vo. That is, Vref=K×Vo ($K \approx Vac_{MIN,PK}/Vo_{MAX}$). For example, reference voltage generation circuit 222 can obtain reference voltage Vref according to output voltage sample signal Vo'. In such a case, the ratio of reference voltage Vref to output voltage sample signal Vo' is K×(Vo/Vo'), in order to obtain the same ratio.

In addition, since control circuit 22 turns on the active switching devices when absolute value |Vac| of AC input voltage Vac decreases close to reference voltage Vref, bias voltage Voffset can be superimposed on reference voltage Vref in order to obtain reference voltage Vref1. Then, the turn-on time of the active switching devices can be obtained by comparing absolute value |Vac| of AC input voltage Vac against reference voltage Vref1.

In this example, reference voltage generation circuit 222 can also include proportion circuit 2221 and superposition circuit 2222. For example, proportion circuit 2221 can obtain reference voltage Vref1 in accordance with output voltage Vo or output voltage sample signal Vo'. Superposition circuit 2222 can superimpose bias voltage Voffset on reference voltage Vref, in order to obtain reference voltage Vref1. In such a case, when absolute value |Vac| of AC input voltage Vac decreases close to reference voltage Vref, the active switching device can be turned on. Further, comparison circuit 223 can determine whether absolute value |Vac| of AC input voltage Vac decreases close to reference voltage Vref; that is, decreases to reference voltage Vref1. If absolute value |Vac| of AC input voltage Vac decreases close to reference voltage Vref1, comparison signal Vcmp generated by comparison circuit 223 can be at a high level.

For example, when AC input voltage Vac is greater than 0 and AC input voltage Vac decreases to reference voltage Vref1, the active switching device(s) in one conductive rectifying loop can be turned on. Here, the conductive rectifying loop may be formed from terminal L of AC input voltage Vac—diode D1—input electrolytic capacitor Cin—active switching device S1 to terminal N of AC input voltage Vac. When AC input voltage Vac is less than 0 and AC input voltage Vac decreases to reference voltage Vref1, the active switching device(s) in another conductive rectifying loop can be turned on. Here, the conductive rectifying loop may be formed from terminal N of AC input voltage Vac—diode D2—input electrolytic capacitor Cin—active switching device S2 to terminal L of AC input voltage Vac. Thus, logic circuit 224 and driving circuit 226 can control the active switching device(s), such as active switching device S1, in one conductive rectifying loop to be turned on or off.

Similarly, logic circuit 225 and driving circuit 227 can control the active switching device(s), such as active switching device S2, in another conductive rectifying loop to be turned on or off. In this example, logic circuits 224 and 225 are implemented as AND-gate circuits.

Figure 5:
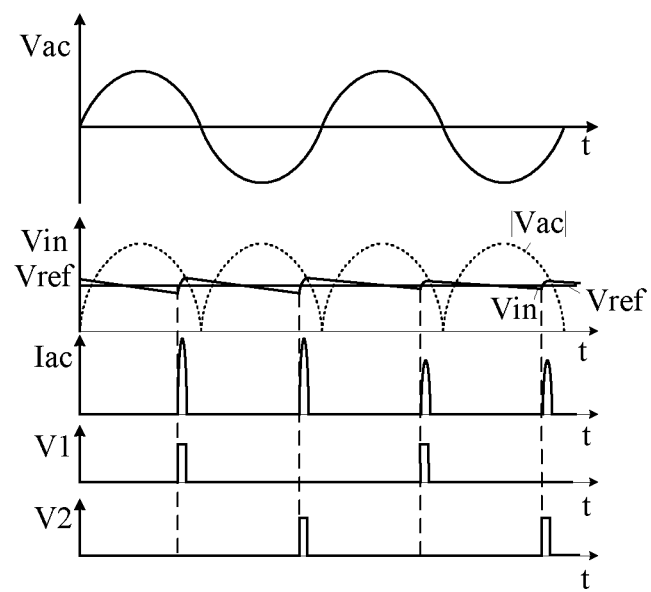
FIG. 5 is a waveform diagram of example operation of the AC-DC converter, in accordance with embodiments of the present invention.

Referring now to FIG. 5, shown is a waveform diagram of example operation of the AC-DC converter, in accordance with embodiments of the present invention. When AC input voltage Vac is greater than zero, a first input terminal of logic circuit 224 can be at a high level. Further, when AC input voltage Vac or absolute value |Vac| decreases close to reference voltage Vref (e.g., decreases to reference voltage Vref1), the second input terminal of logic circuit 224 can be at a high level. At the same time, logic circuit 224 may generate a logic signal with a high level. Thus, driving circuit 226 can generate driving signal V1 according to the logic signal, thereby turning on active switching device S1. In such a case, the loop from terminal L of AC input voltage Vac—diode D1—input electrolytic capacitor Cin—active switching device S1 to terminal N of AC input voltage Vac may be conductive. Thus, AC input voltage Vac can charge input electrolytic capacitor Cin, such that DC voltage Vin approaches reference voltage Vref.

When AC input voltage Vac is less than zero, the first input terminal of logic circuit 225 may be at a high level. Further, when AC input voltage Vac decreases close to reference voltage Vref (e.g., decreases to reference voltage Vref1), the second input terminal of logic circuit 225 may be at a high level. At the same time, logic circuit 225 can generate a logic signal with a high level. Thus, driving circuit 227 may generate driving signal V2 according to the logic signal, thereby turning on active switching device S2. In such a case, the loop from terminal N of AC input voltage Vac—diode D2—input electrolytic capacitor Cin—active switching device S2 to terminal L of AC input voltage Vac can be conductive. Thus, AC input voltage Vac can charge input electrolytic capacitor Cin, such that DC voltage Vin approaches reference voltage Vref. That is, only the active switching device in one conductive rectifying loop can be turned on during each half of the period of AC input voltage Vac.

It should be noted that when the active switching device is a transistor, control circuit 22 can control rectification circuit 21 to stop working when input AC voltage Vac or input current Iac crosses zero. Also, since the thyristor can be turned off when the current flowing through the thyristor below its holding current, when the active switching device is a thyristor, special turn-off logic circuitry is not needed and it will be automatically turned off when input current Iac near zero, such that rectifier circuit 21 also stops working. In addition, thyristors S1 and S2 can be unidirectional thyristors or bidirectional thyristors, both of which have bidirectional withstand voltage functions. Also, driving circuits 226 and 227 can drive the active switching devices by optical couplers or transformers.

As mentioned above, control circuit 22 obtains reference voltage Vref according to output voltage Vo. When the absolute value of AC input voltage Vac decreases close to reference voltage Vref, the active switching device can be turned on, in order to adjust DC voltage Vin to approach a voltage that characterizes reference voltage Vref. Further, the ratio of DC voltage Vin to output voltage Vo can approach a predetermined ratio.

In particular embodiments, active switching devices can be utilized instead of a traditional bridge rectifying circuit, which decreases loss due to the rectifying circuit. Also, the ratio of the DC voltage to the output voltage can approach a predetermined ratio, such that the ratio of the DC voltage across the input electrolytic capacitor to the output voltage may vary within a relatively small range. As a result, the efficiency of the DC-DC converter can be greatly improved, and the volume of the AC-DC converter reduced since the withstand voltage and volume of the input electrolytic capacitor are decreased. Therefore, particular embodiments are suitable for a variety of applications (e.g., AC-DC power supply, mobile phone charger, etc.).

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. An AC-DC converter, comprising:
   a) a rectifying circuit configured to convert an AC input voltage into a DC voltage, wherein at least one active switching device is included in one conductive rectifying loop of the rectifying circuit;
   b) a control circuit configured to control switching states of the active switching devices according to an output voltage of the AC-DC converter and the AC input voltage, in order to decrease an error between the DC voltage and the output voltage, wherein the control circuit is configured to obtain a reference voltage in accordance with the output voltage, and to adjust the DC voltage in accordance with the reference voltage by adjusting switching states of the active switching devices, such that the ratio of the DC voltage to the output voltage approaches a predetermined ratio; and
   c) a DC-DC converter configured to convert the DC voltage into the output voltage.

2. The AC-DC converter of claim 1, wherein the control circuit is configured to adjust the DC voltage to decrease a ratio of the output voltage to the DC voltage.

3. The AC-DC converter of claim 2, further comprising an input capacitor coupled between the rectifying circuit and DC-DC converter.

4. The AC-DC converter of claim 1, wherein the rectifying circuit is a single-phase bridge rectifying circuit.

5. The AC-DC converter of claim 4, wherein rectifying devices in at least one bridge arm of the single-phase bridge rectifying circuit are active switching devices.

6. The AC-DC converter of claim 4, wherein at least one of the rectifying devices connected with one terminal of an output port of the rectifying circuit are active switching devices.

7. The AC-DC converter of claim 1, wherein the active switching device bears a positive withstand voltage or a negative withstand voltage.

8. The AC-DC converter of claim 1, wherein the active switching device is a semi-controlled thyristor or a full-controlled transistor.

9. The AC-DC converter of claim 1, wherein the reference voltage is proportional to the output voltage of the AC-DC converter, and a ratio of the reference voltage to the output voltage is a ratio of a peak value of the AC input voltage when a range of the AC input voltage is minimum to a maximum value of the output voltage.

10. The AC-DC converter of claim 1, wherein the adjusting switching states comprises adjusting a duty ratio or on time of the active switching devices.

11. The AC-DC converter of claim 1, wherein the control circuit is configured to turn on the corresponding active switching device when an absolute value of the AC input voltage decreases close to the reference voltage, such that the AC input voltage charges the input capacitor of the DC-DC converter to control the DC voltage approaches to the reference voltage.

12. The AC-DC converter of claim 11, wherein when the active switching device is a transistor, the control circuit is configured to control the rectifying circuit to stop working when the AC input voltage or an input current of the rectifying circuit reaches zero.

13. The AC-DC converter of claim 11, wherein when the AC input voltage is greater than zero and the AC input voltage decreases to a sum of the reference voltage and a bias voltage, the active switching device in a conductive rectifying loop is turned on.

14. The AC-DC converter of claim 13, wherein when the AC input voltage is less than zero and the AC input voltage decreases to the sum of the reference voltage and the bias voltage, the active switching device in another conductive rectifying loop is turned on.

15. The AC-DC converter of claim 11, wherein the control circuit comprises:
   a) a comparison circuit configured to compare the absolute value of the AC input voltage against the sum of the reference voltage and a bias voltage, and to generate a comparison signal; and
   b) a logic circuit configured to generate a control signal for the active switching device according to the comparison signal and the relationship between the AC input voltage and zero.

16. An AC-DC rectifier, applied in an AC-DC switching converter, the AC-DC rectifier comprising:
   a) a first and second switching devices coupled in series between a positive terminal and a negative terminal of a DC voltage;
   b) third and fourth switching devices coupled in series between the positive terminal and the negative terminal of the DC voltage;
   c) wherein at least one of the first, second, third, and fourth switching devices is configured as an active switching device in one conductive rectifying loop of the AC-DC rectifier;
   d) wherein an AC input voltage is coupled between a common node between the first and second switching devices and a common node between the third and fourth switching devices; and
   e) a control circuit configured to control switching states of the active switching devices according to an output voltage of the AC-DC switching converter and the AC input voltage, thereby decreasing an error between the DC voltage and the output voltage, wherein the output voltage is generated by converting the DC voltage through a DC-DC switching converter of the AC-DC switching converter, wherein the control circuit is configured to obtain a reference voltage in accordance with the output voltage, and to adjust the DC voltage in accordance with the reference voltage by adjusting switching states of the active switching devices, such that the ratio of the DC voltage to the output voltage approaches a predetermined ratio.

\* \* \* \* \*